(12) United States Patent
Eccleston et al.

(10) Patent No.: US 7,790,024 B2
(45) Date of Patent: Sep. 7, 2010

(54) APPARATUS FOR THE ELECTROCHEMICAL REGENERATION OF ABSORBENTS

(75) Inventors: Kenneth Thomas Eccleston, Lichfield (GB); Amy Jane Eccleston, legal representative, Lichfield (GB); June Lilian Richards, legal representative, Walsall (GB); Nigel Willis Brown, Stoke-on-Trent (GB); Edward P. L. Roberts, Chester (GB)

(73) Assignee: Arvia Technology Limited, Liverpool, Merseyside (GB)

( * ) Notice: Subject to any disclaimer, the term of this patent is extended or adjusted under 35 U.S.C. 154(b) by 0 days.

(21) Appl. No.: 12/258,864

(22) Filed: Oct. 27, 2008

(65) Prior Publication Data

US 2009/0242488 A1    Oct. 1, 2009

Related U.S. Application Data

(63) Continuation of application No. PCT/GB2007/001544, filed on Apr. 27, 2007.

(51) Int. Cl.
*C02F 1/28* (2006.01)
*C02F 1/46* (2006.01)

(52) U.S. Cl. .................. 210/150; 210/151; 210/189; 210/220; 210/269

(58) Field of Classification Search ......... 210/150–151, 210/189, 220, 269
See application file for complete search history.

(56) References Cited

U.S. PATENT DOCUMENTS 2,946,733 A * 7/1960 Gaysowski .............. 204/229.8

FOREIGN PATENT DOCUMENTS

| GB | 1494162 A | 12/1977 |
| GB | 1506731 A | 4/1978 |
| JP | 05305281 A | 11/1993 |

OTHER PUBLICATIONS

Letter dated Sep. 28, 2009 enclosed search report conducted at British Patent Office.

* cited by examiner

*Primary Examiner*—Chester T Barry
(74) *Attorney, Agent, or Firm*—McAndrews, Held & Malloy, Ltd.

(57) ABSTRACT

Apparatus for treating liquid by contact with a particulate adsorbent material comprises a regeneration chamber (10) within a reservoir (2) for liquid to be treated. Adsorbent material is recycled along a path including passage through the regeneration chamber (10) and in a body of liquid in the reservoir to contact and treat the liquid. The adsorbent material is capable of regeneration, and the regeneration chamber (10) is defined between two electrodes (36, 38), which can be coupled to a source of electrical power. The treatment process can be continuous with liquid flowing through the reservoir while the adsorbent material is recycled and regenerated. Alternatively, individual quantities of liquid may be treated on a batch basis. A plurality of regeneration chambers may be arranged within a common reservoir, such as in a bank of chambers aligned along an axis thereof.

19 Claims, 2 Drawing Sheets

APPARATUS FOR THE ELECTROCHEMICAL REGENERATION OF ABSORBENTS

RELATED APPLICATIONS

This application claims priority to, and is a continuation of International Application No. PCT/GB2007/001544 having an International filing date of Apr. 25, 2007, which is incorporated herein by reference, and which claims priority to Great Britain Patent Application No. 0608352.1 filed Apr. 28, 2006.

BACKGROUND/SUMMARY

This invention relates to the treatment of contaminated liquid by contact with an adsorbent material. The invention has particular, but not exclusive application in the treatment of liquids to remove organic pollutants. Although the invention has particular use in the anodic oxidation of organic compounds, it can also be used for the cathodic reduction of compounds. It can also be used for disinfection.

Adsorbent materials are commonly used in liquid treatment apparatus. Carbon-based such materials are particularly useful, and are capable of regeneration by the passage of an electric current therethrough. The use of carbon-based adsorbents in the treatment of contaminated water is described in the following papers published by The University of Manchester Institute of Science and Technology (now the University of Manchester) in 2004, incorporated herein by reference:

Electrochemical regeneration of a carbon-based adsorbent loaded with crystal violet dye by N W Brown, E P L Roberts, A A Garforth and R A W Dryfe Electrachemica Acta 49 (2004) 3269-3281

Atrazine removal using adsorption and electrochemical regeneration by N W Brown, E P L Roberts, A Chasiotis, T Cherdron and N Sanghrajka Water Research 39 (2004) 3067-3074

The present invention is directed at apparatus for exploiting the ability of the use of an adsorbent material capable of regeneration in the treatment of contaminated liquid. According to the invention, apparatus for treating liquid by contact with a particulate adsorbent material, comprises a reservoir having an inlet and an outlet for liquid to be treated, with a regeneration chamber within the reservoir. Means are provided for recycling adsorbent material along a path including passage through the regeneration chamber and in a body of liquid in the reservoir. The regeneration chamber is defined between two electrodes for coupling to a source of electrical power. In use, a voltage can be applied between the electrodes, either continuously or intermittently, to pass current through the adsorbent material and regenerate it in the manner described in the papers referred to above. The adsorbent material is typically carbon-based.

The treatment and regeneration process can be continuous or semi-continuous. An individual volume of liquid can be treated as a batch, with the adsorbent material being regenerated as the respective batch is treated, or between batch treatments. Some compounds may also be treated within an undivided cell, provided there is no continuous electrical connection between the cathode and anode through the solid conducting adsorbent material. In a continuous or semi-continuous process the flow rate of the liquid through the apparatus is determined and controlled to ensure a sufficient dwell time in contact with the recycling adsorbent.

Apparatus of the invention can be used with a single regeneration chamber, or with a plurality of regeneration chambers in more substantial equipment. Such a plurality of chambers can be in the form of a bank mounted in a common reservoir, which can accommodate circulation of adsorbent material only from either side of the chambers with the chambers closely aligned along an axis of the reservoir and extending to opposing end walls of the reservoir. In another arrangement the bank can accommodate circulation from the sides and ends of a bank of closely aligned chambers within the reservoir and spaced from its end walls. In yet another arrangement circulation can be from around the periphery of each chamber spaced from adjacent chambers in the reservoir. The use of a common reservoir in this way facilitates the recycling of adsorbent material and the flow of liquid through the equipment in greater quantities. A common inlet and outlet can be used for the liquid to be treated, and a single system can be used to recycle the adsorbent. Although the chambers are arranged in a bank, individual electrodes will normally be associated with each chamber for regeneration of the adsorbent.

In apparatus according to the invention, the adsorbent material can be recycled along a variety of different paths, at least a part of which will coincide with the path of liquid to be treated through the reservoir. In that part, the liquid and adsorbent can pass in either the same or the opposite direction. Normally, contaminated liquid will be delivered at the base of the reservoir, and discharged from an upper location, while the adsorbent material follows at least one continuous path within the reservoir.

Recycling of the adsorbent is most easily accomplished by delivery of air to the base or one or more sections of the path which carry the material upwards in that section or sections. This movement carries the material over a boundary at the top of the regeneration chamber, in which it then falls under gravity. As it moves through the regeneration chamber, the applied voltage causes a current to flow through the material, destroying the adsorbed pollutants. The breakdown products can be released in gaseous form, and treated separately as appropriate.

The use of air to recycle the adsorbent material is of course beneficial in itself to the treatment process. It aerates the contaminated liquid, as well as agitating the adsorbent material as it is recycled, thereby enhancing its exposure to the contaminated liquid. Incoming liquid can also be used to entrain and assist in circulating the adsorbent from the bottom of the regenerating chamber. This can be of benefit when treating liquids containing surface active compounds which could result in foaming. Of course, different fluids can be used to accomplish different treatments of various liquids in the apparatus.

The recycling path for the adsorbent material and the regeneration chamber can be arranged differently in a reservoir, depending on the requirements for liquids to be treated, contact time of liquids to be treated and the amount of material to which the liquid should be exposed. In a preferred arrangement, the regeneration chamber is located centrally within a reservoir, with the adsorbent material being adapted to fall through it, and be recycled upwardly within the reservoir and through the liquid to be treated on the outside of the chamber, A convenient design of apparatus has the regeneration chamber located between two treatment chambers, one on either side thereof, in what is effectively a two-dimensional arrangement. The electrodes for the regeneration chamber can then be disposed on opposite faces thereof, these faces being different from the sides against which the treatment chambers are defined. This arrangement can though, of course be extended to three-dimensions with the regeneration chamber being surrounded by a plurality of treatment chambers. These arrangements can also be reversed, with a single treatment chamber located centrally either within an annular regeneration chamber, or surrounded by an array of regeneration chambers.

Adsorbent materials suitable for use in this invention are electrically conducting solid materials capable of easy separation from the liquid phase. The material may be used in powder, flake or granular form. Whilst the particle size is not critical, the optimum size will depend on the adsorbent properties. The material used and particularly the particle size is a compromise between surface area, electrical conductivity and ease of separation. Preferred materials are graphite intercalation compounds (GICs). A particularly preferred GIC is a bi-sulphate intercalated product.

It can be formed by chemically or electrochemically treating graphite flakes in oxidising conditions in the presence of sulphuric acid. However a large number of different GIC materials have been manufactured and different materials will have different adsorptive properties which will be a factor in selecting a particular material.

Reducing the particle size of the adsorbent material will significantly increase the surface area available for adsorption. However reducing the particle size will make separation of the solid phase more difficult. in the practice of the invention a typical particle size is 0.25-0.75 mm. Very fine particles (<50 microns) can be used as the adsorbent material as these can be separated from the liquid phase easily if an organic polymer is used as a flocculent. This organic flocculent is then destroyed by regeneration. The use of other materials of lower electrical conductivity and density would benefit from larger particles.

The higher the electrical conductivity of the adsorbent material, the lower will be the voltage required across the cell and so the lower power consumption. Typical individual GIC particles will have electrical conductivities in excess of 10,000 $\Omega^{-1}cm^{-1}$. However in a bed of particles this will be significantly lower as there will be resistance at the particle/particle boundary. Hence it is desirable to use as large a particle as possible to keep the resistance as low as possible. Hence a bed of fine wet particles has been shown to have an electrical conductivity of 0.16 $\Omega$-1$cm^{-1}$ compared with 0.32 $\Omega^{-1}cm^{-1}$ for a bed of larger particles. As a comparison a bed of granular and powdered activated carbon would typically have electrical conductivities of 0.025 and 0.012 $\Omega^{-1}cm^{-1}$ respectively.

The preferred GIC used in the practice of the invention is in flake form, and typically has a composition of at least 95% carbon, and a density of around 2.225 g $cm^{-3}$. However flake carbons can be used as the starting materials for producing GICs with significantly lower carbon contents (80% or less). These compounds can also be used within the cell, but are likely to result in slightly higher voltages across the electrochemical regeneration stage. Other elements will also be present within the GIC, these compounds are dependent on the initial composition of the flake graphite and the chemicals used to convert the flakes into intercalated form. Different sources of graphite can produce GICs with different adsorptive properties.

BRIEF DESCRIPTION OF SEVERAL VIEWS OF THE DRAWINGS

Embodiments of the invention will now be described by way of example and with reference to the accompanying schematic drawings wherein.

DETAILED DESCRIPTION

Figure 1:
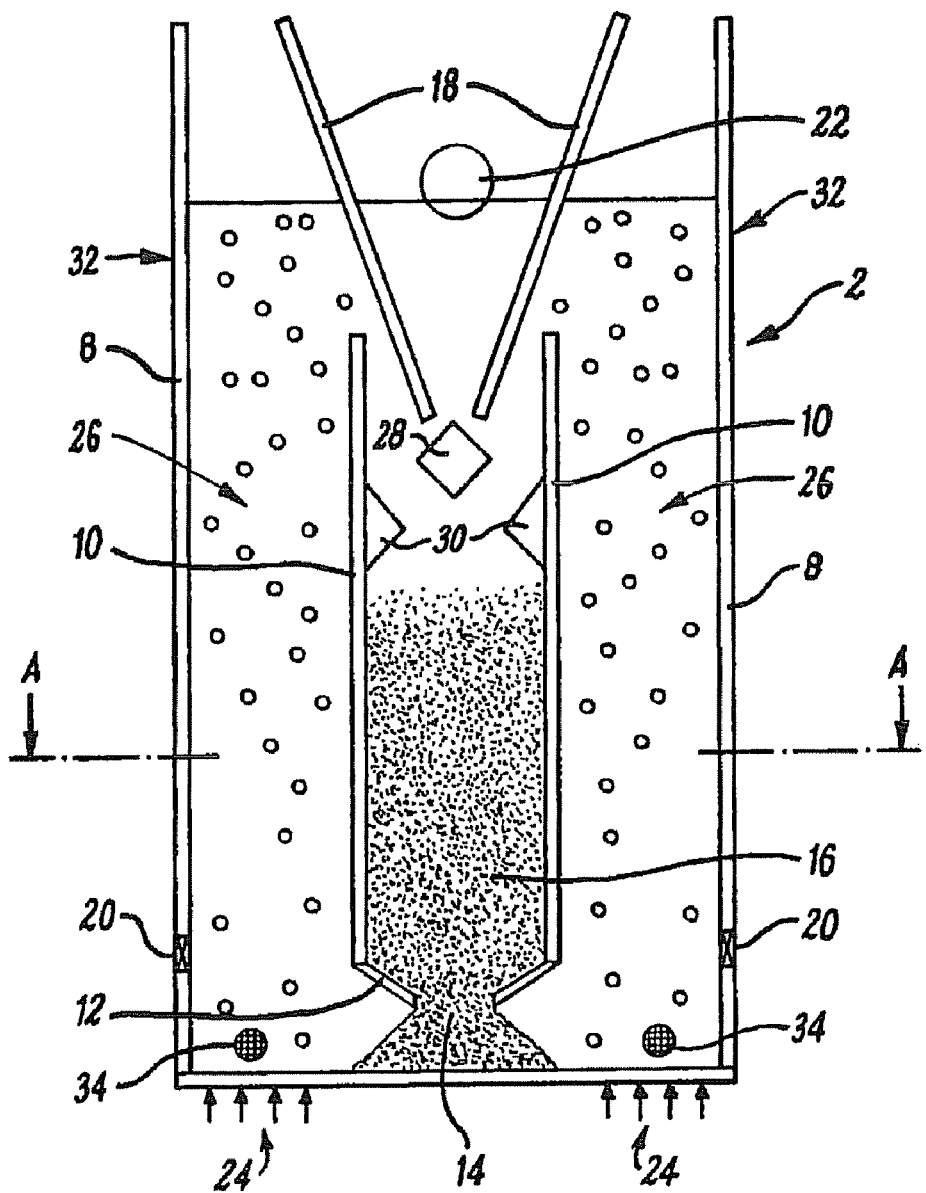
FIG. 1 is a vertical cross-section through apparatus according to a first embodiment of the invention.
Figure 2:
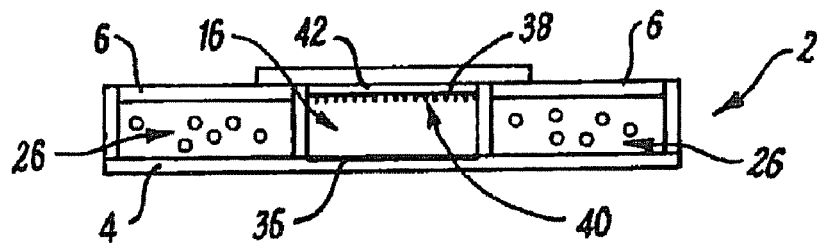
FIG. 2 is a horizontal cross-section taken on line A-A of FIG. 1.

The drawings show a reservoir 2 of generally rectangular cross-section defined by front and rear walls 4 and 6, and side walls 8. Within the reservoir, inner walls 10 define a regeneration chamber that extends the whole width of the reservoir between the front and rear walls 4 and 6 (FIG. 2). The base of the regeneration chamber is defined by convergent walls 12, which form an opening 14 for the discharge of particulate adsorbent material 16 from the regeneration chamber. Upper walls 18 define a central zone over the regeneration chamber.

When the apparatus is ready for use, an adsorbent material is loaded into the regeneration chamber 10 in the required amount. Liquid to be treated is then delivered to the reservoir through inlets 20, and filled to a level just below that of the discharge outlet 22 between the upper walls 18. Air under pressure is then delivered through openings in the base of the reservoir as indicated at 24. This generates bubbles in the liquid, and draws particulate adsorbent material from below the opening 14 at the bottom of the regeneration chamber, and carries it upward through treatment chambers 26 defined in the reservoir between the respective walls 8 and 10. As the adsorbent material is carried upwards through the liquid, it absorbs pollutants in the liquid. The rising air carries the adsorbent material around and over the top of the walls 10, where it is directed by the walls 18 back into the regeneration chamber. Obstacles 28 and 30 are installed at the top of the regeneration chamber to control the flow of the solid, liquid and gaseous phases in the reservoir. They can break up any coagulated particles and guide them into the chamber. They also serve to discourage adsorbent particles from entering the zone between the walls 18, from which treated liquid is discharged, and prevent bubbles generated in the bed of adsorbent materials in the regeneration chamber from entering this zone.

Liquid to be treated is delivered to the reservoir through the inlets 20 at a flow rate selected to match its required residence time in the reservoir and contact with the adsorbent material sufficient to enable absorption of pollutants therefrom. Its general flow is upwards through the reservoir, and it is discharged by overflow through the port 22. It will be noted that the liquid can only reach the discharge port 22 by upward flow from the top of the regeneration chamber, between the walls 18. The walls 18 thus define a quiescent zone protected from movement generated by the air bubbling through the liquid in the treatment chambers.

While a generally upward flow of liquid to be treated is preferred, the opposite arrangement can also be used. Thus, liquid to be treated could be admitted at ports indicated at 32, and withdrawn from discharge points 34. Some form of filter would be required at the discharge points because of the proximity of the adsorbent material, but the air flowing upwards from the reservoir base should prevent blockages. The direction of flow of liquid through the reservoir will of course be selected on the basis of the system requirements, but there may be some benefit in having the flow of liquid generally opposite to the flow of adsorbent material in the treatment chambers. That would be case if the general direction of flow of liquid in the reservoir was downwards rather than upwards.

As noted above, the apparatus may be used for the separate treatment of individual volumes of liquid. In this variant, the reservoir is filled with liquid to the required level, and the adsorbent material recycled through the regeneration chamber for a period of time appropriate to complete the treatment. The liquid is then removed, for example by drainage from discharge port 34, and a fresh charge of liquid delivered to the reservoir. The adsorbent material will normally be regenerated while it is recycled during the treatment process.

In apparatus of the invention, the adsorbent material is continuously or intermittently regenerated while it passes through the regeneration chamber in its recycling path. This is accomplished by the application of an electrical voltage between an anode 36 and a cathode 38 disposed on opposite faces of the chamber 16. Pollutants are released by the regenerating adsorbent material in gaseous form, from the top of the reservoir. These released gases can be discharged to the atmosphere, but can of course be subject to separate treatment if required. The cathode is housed in a separate compartment 42 defined by a conductive membrane 40. This enables a catholyte to be pumped through the compartment, and the membrane protects the cathode from direct contact with the adsorbent material.

The purpose of the membrane 40 is to prevent the solid adsorbent particles coming into contact with the cathode 38 as this could result in the electrons going direct from cathode 38 to anode 36 without passing through the aqueous phase. In this case there would be no organic oxidation and no regeneration of the adsorbent. The membrane 40 must allow the transfer of ions or electrons through it to complete the electric circuit. However, this introduces an additional resistance into the system. Such membranes also only operate well at certain pH levels. In this case the oxidation of the water on the anode side (giving acid conditions) and reduction of water on the cathode side (giving alkali conditions) necessitates pH adjustment to keep the membrane functioning with an acceptable voltage. In practice this requires the catholyte to be monitored and adjusted to keep it acidic, for example by the constant addition of acid, which is undesirable, the pumping of catholyte through the cathode compartments, and suitable pH monitoring and adjustment equipment involving tanks, pumps and probes, which incurs further capital, operational' and maintenance costs.

An alternative to the use of a conductive membrane is to use a porous filter. This would prevent the contact of the solid with the cathode, but allow the passage of. water and ions. The constant reduction of water at the cathode would result in the catholyte becoming more alkaline, giving a higher conductivity and lower cell voltages.

Figure 3:
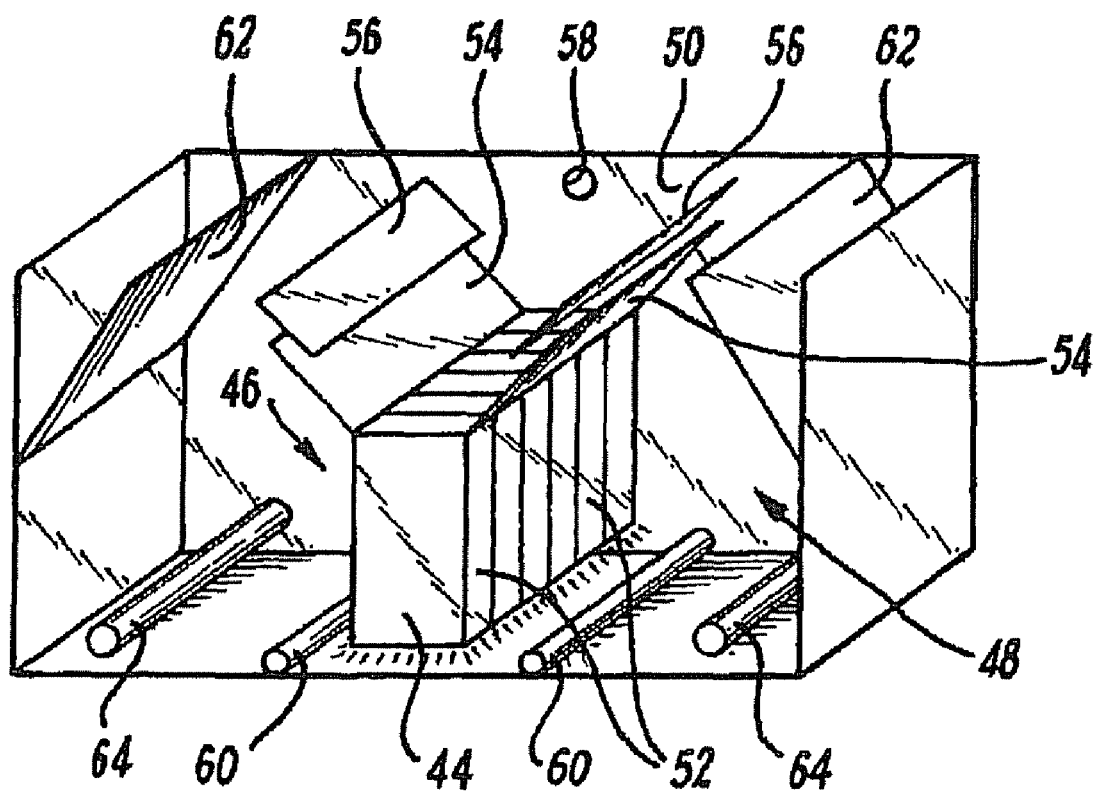
FIG. 3 is a perspective, partly broken view illustrating a second embodiment of the invention.

FIG. 3 illustrates a second embodiment of the invention in which a plurality of regeneration chambers 44 are mounted in the form of a bank 46 in a reservoir 48. The chambers 44 are closely aligned, and extend to opposing end walls 50 of the reservoir (only one end wall is shown). The walls 52 of the regeneration chambers extend upwards and laterally from the chambers themselves in the form of plates 54 which assist in guiding the circulating mixture of particles and liquid into the regeneration chambers. Additional walls 56 are provided as further guides for the recirculating mixture, and define a quiescent zone from which liquid is discharged by overflow through the outlet port 58.

Circulation of the adsorbent material in the mixture is achieved by the delivery of air under pressure to conduits 60 on either side of the bank 46. Air is released from openings (not shown) in the conduits 60, which rises upward and along the external surface of the plates 54. Additional plates 62 can be fitted to guide the particulate material back towards the entrance to the bank 46 of regeneration chambers 44, between the plates 54 and walls 56.

The liquid to be treated is introduced into the reservoir 48 through ducts 64. A plurality of outlets from the duct into the reservoir can be used. It will be appreciated that the actual and relative orientation of the conduits 60 and ducts 64 within the reservoir can be selected as the size, location and orientation of the plates and walls 54, 56 and 62, in order to achieve the desired circulation of the adsorbent material.

In the arrangement illustrated in FIG. 3, the regeneration, chambers 44 are aligned closely together, substantially in contact with one another and with the end chambers substantially abutting against an end wall of the reservoir 48. This arrangement results in a predictable movement of the adsorbent material, in generally circular paths on either side of the reservoir axis. However, there can be some merit in creating gaps between the regeneration chambers to enable some adsorbent material to recirculate without passing through the regeneration chamber. In yet another arrangement the regeneration chambers need not be aligned, but rather be individually mounted in different locations within the reservoir.

In the apparatus illustrated in FIG. 3, the adsorbent material is regenerated while it passes through each regeneration chamber in its recycling path, generally as described above with reference to FIG. 2. The anode and cathode will though, normally be disposed at the lower end of the regeneration chamber side walls 52 to avoid interference with regeneration in adjacent chambers.

The invention claimed is:

1. Apparatus for treating liquid by contact with a particulate adsorbent material, comprising a reservoir for liquid to be treated; a regeneration chamber within the reservoir, and means for recycling adsorbent material along a path including passage through the regeneration chamber and in a body of liquid in the reservoir, wherein the adsorbent material is capable of regeneration, and the regeneration chamber is defined between two electrodes for coupling to a source of electrical power.

2. Apparatus according to claim 1 including means for moving liquid through the reservoir from an inlet to and an outlet from the reservoir.

3. Apparatus according to claim 2 wherein the reservoir and chamber define at least one endless path for recycling adsorbent material and a path for the liquid from the inlet to the outlet of which a part coincides with a part of the endless path for carrying the liquid and adsorbent in the same direction therealong.

4. Apparatus according to claim 2 wherein the reservoir and chamber define at least one endless path for recycling adsorbent material and a path for the liquid from the inlet to the outlet of which a part coincides with a part of the endless path for carrying the liquid and adsorbent in the opposite direction therealong.

5. Apparatus according to claim 2 wherein the inlet for liquid to be treated is at the base of the reservoir, as the outlet for liquid is at an upper location in the reservoir.

6. Apparatus according to claim 5 wherein the outlet for liquid from the reservoir is disposed relative to the path of recycling adsorbent material to be vertically above said path when the apparatus is in use.

7. Apparatus according to claim 1 wherein the recycling means comprises means for delivering air under pressure to the base of the reservoir to move the adsorbent material along the recycling path.

8. Apparatus according to claim 1 wherein the regeneration chamber is defined between an anode and a cathode, and wherein at least the cathode is shielded from the liquid and particulate material in the chamber by a conductive membrane.

9. Apparatus according to claim 1 wherein the cathode is housed in a separate compartment within the reservoir.

10. Apparatus according claim 1 in which a plurality of regeneration chambers are mounted in a common reservoir.

11. Apparatus according to claim 10 wherein the regeneration chambers are arranged in a bank of chambers aligned along an axis of the reservoir.

12. Apparatus according to claim 11 wherein the chambers are closely aligned and extend to opposing end walls of the reservoir.

13. Apparatus according to claim 1 wherein the recycling path for the adsorbent material comprises the regeneration chamber and at least one adjacent treatment chamber within the reservoir, which chambers define substantially parallel sections of the recycling path.

14. Apparatus according to claim 13 wherein the regeneration chamber is disposed between two treatment chambers.

15. Apparatus according to claim 13 wherein the regeneration chamber is surrounded by a plurality of treatment chambers.

16. Apparatus according to claim 13 including two regeneration chambers, one on either side of a treatment chamber.

17. Apparatus according to claim 1 wherein the regeneration chamber is disposed to form a part of the recycling path in which adsorbent material moves vertically downwards.

18. Apparatus according to claim 1 including an electrically conductive particulate adsorbent material.

19. Apparatus according to claim 1 including a carbon-based particulate adsorbent material.

* * * * *

UNITED STATES PATENT AND TRADEMARK OFFICE
CERTIFICATE OF CORRECTION

| | |
|---|---|
| PATENT NO. | : 7,790,024 B2 |
| APPLICATION NO. | : 12/258864 |
| DATED | : September 7, 2010 |
| INVENTOR(S) | : Kenneth Eccleston et al. |

It is certified that error appears in the above-identified patent and that said Letters Patent is hereby corrected as shown below:

Cover page, item (54), delete "APPARATUS FOR THE ELECTROCHEMICAL REGENERATON OF ABSORBENTS" and substitute therefor -- APPARATUS FOR THE ELECTROCHEMICAL REGENERATON OF ADSORBENTS --.

At column 1, lines 1 and 2, please delete "APPARATUS FOR THE ELECTROCHEMICAL REGENERATON OF ABSORBENTS" and substitute therefor -- APPARATUS FOR THE ELECTROCHEMICAL REGENERATON OF ADSORBENTS --.

At Column 4, line 29, delete "absorbs" and substitute therefor -- adsorbs --.

At Column 4, line 44, delete "absorption" and substitute therefor -- adsorption --.

Signed and Sealed this
Eighteenth Day of January, 2011

David J. Kappos
*Director of the United States Patent and Trademark Office*